United States Patent Office 3,432,527
Patented Mar. 11, 1969

3,432,527
CORROSION INHIBITOR COMPOSITION
AND METHOD
Robert E. Malec and Roy J. Betty, Jr., Chicago, Ill., assignors to Armour Industrial Chemical Company, a corporation of Delaware
No Drawing. Filed Nov. 5, 1964, Ser. No. 409,271
U.S. Cl. 252—392          5 Claims
Int. Cl. C23f 11/14, 11/10

ABSTRACT OF THE DISCLOSURE

A method for combating corrosion, particularly in oil and gas well operations using the novel synergistic composition of the naphthenic acid salts of polyamines in admixture with a mixture of heterocyclic nitrogenous compounds as contained in the crude, semipurified or purified by-products having a boiling point of about 200° F. to 750° F. resulting from the refining of gilsonite.

---

This invention relates to novel compositions and methods for economically combating corrosion, particularly in oil and gas well operations. More particularly, this invention relates to corrosion inhibition of metal surfaces particularly ferrous metal surfaces such as encountered in petroleum production by using the highly potent compositions comprising the naphthenic acid salts of mixed polyamines, their hydroxy alkyl or polyoxyalkylene derivatives, and heterocyclic nitrogenous crude mixtures derived from gilsonite.

Use of the naphthenic acid salts of polyamines, their hydroxy alkyl or polyoxyalkylene derivatives as corrosion inhibitors is well known. U.S. 2,914,475 and U.S. 2,914,557, indicate that such salts inhibit corrosion of equipment used in the recovery, transportation and treatment of oil and gas well fluids and gas condensate fluids and water associated with such treatment, or with well flooding. The salts, particularly the petroleum salts, are commingled with the well fluids by introducing them, either alone or dissolved in a suitable solvent, into the well tubing. Or else, the salts are incorporated in a solid microcrystalline wax stick and the stick deposited into the well.

Large amounts of such inhibitor must be utilized to effectively control corrosion because of the large amounts of liquid being treated. It would be extremely desirable to improve their potency or to discover new compositions which utilize said inhibitors which are synergistc. Substantial savings to the industry could obviously be realized.

An object of this invention is to provide a novel corrosion inhibitor composition.

Another object is to provide a novel method for inhibiting corrosion.

Another object is to provide a corrosion inhibitor composition which utilizes less actual corrosive inhibitor and filler which is relatively inexpensive while retaining at least substantially the same inhibitor level as the inhibitor alone.

A further object is to provide a corrosion inhibitor composition which has enhanced corrosion inhibition abilities per unit concentration of inhibitor used.

Other objects of the invention will in part be obvious and will in part appear hereinafter.

The invention accordingly comprises the several steps and the relation of one or more of such steps with respect to each of the others, and the composition possessing the features, properties, and the relation of constituents which are exemplified in the following detailed disclosure, and the scope of the invention will be indicated in the claims.

It has now been found that when the crude mixed heterocyclic nitrogenous material derived from the mineral gilsonite is added to the polyamines, which includes their hydroxy alkyl and polyoxy-alkylene derivatives, and the mixture neutralized with petroleum naphthenic acid, a unique enhancement in corrosion inhibition ability per unit concentration of acid salt utilized is effected. The crude mixed heterocyclic nitrogenous material occurs as a by-product in the manufacture of petroleum products from the aforementioned mineral "gilsonite" by The American Gilsonite Company. It has been described as containing predominantly mixed alkylated pyridines, pyrroles, indoles, and quinolines, with some of the substituent carbon chains being olefinic. It also contains some unidentified nonnitrogenous material. However, it is believed to be an inordinately complex mixture of chemical structures. Well over one hundred different compounds are indicated as being present in the mixture, based on gas chromatographic procedures. The extreme complexity of such a mixture of materials renders a complete qualitative analysis almost prohibitive.

Utilization of all crude, semipurified or purified by-products and having a boiling point of greater than about 200° F. resulting from the refining of gilsonite, are utilizable with the salts. Naturally, the composition of such mixed heterocyclic nitrogenous by-products will vary with the composition of the original gilsonite, the point in the refining process from which they are extracted, the boiling range in which they are extracted, and the like. The invention herein described presupposes utilization of all such mixed heterocyclic nitrogenous compounds either in crude or in purified forms. The preferred mixed heterocyclic nitrogen compounds in the practice of this invention are those which have a boiling range of about 200° F. to about 750° F. and particularly those which have an average boiling point within the range of about 450° to about 750° F.

The American Gilsonite Company has assigned descriptive nomenclature to various fractions of this type material as follows:

(1) Light bases from HBF

Extracted from a naphtha stream of approximately 283° F. volumetric average boiling point and 22° F. to 400° F. boiling range.

(2) Intermediate bases from PFB

Extracted from a heavy naphtha stream of approximately 422° F. volumetric average boiling point and 400° F. to 590° F. boiling range.

(3) Medium bases from LGO

Extracted from a gas-oil stream of about 520° F. volumetric average boiling point and 460° F to 665° F. boiling range.

(4) Semipurified acid extracted nitrogen compounds (a) Nitrogen bases I—boiling range 491° F. to 509° F. at 760 mm.

(b) Nitrogen bases II—boiling range 610° F. to 641° F. at 760 mm.

(c) Nitrogen compounds III—boiling range 700° F. to 710° F. at 760 mm.

(d) Nitrogen compounds IV—boiling range 745° F. to 755° F. at 760 mm.

(e) Bottoms V—boiling range 755° F. and higher at 760 mm.

(5) Nitrogen distillate

A crude mixture of nitrogen bases obtained by distillation and representative of (4(a)) through (4(c)) inclusive as above, plus some nonnitrogenous compounds.

With respect to the polyamines useful for such neutralization, the diamines are preferred. Those diamines having the following structure are most useful:

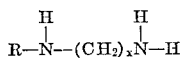

wherein R is an aliphatic hydrocarbon from 8 to 22 carbon atoms and $x$ is an integer from 2 to 4. Typical of aliphatic hydrocarbon radicals falling within the $C_8$ to $C_{22}$ range are: octyl, nonyl, decyl, undecyl, dodecyl, tridecyl, tetradecyl, pentadecyl, hexadecyl, heptadecyl, octadecyl, nonadecyl, eicosyl, henicosyl, docosyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, henicosenyl, docosenyl, octadecadienyl, octadecatrienyl, and eicosatetraenyl, and docosapentenyl, and mixtures thereof, especially those contained in the natural fats and oils such as in tallow, coconut, cottonseed and soybean oil.

With respect to the petroleum naphthenic acids that are useful, any derived from petroleum cracking operations are operable. Most major oil companies such as Mobil Chemical Company and Sun Oil Company sell these.

For some reason, the gilsonite-derived mixture imparts a greater corrosion inhibitor effectiveness to the salt so that a lesser quantity of the expensive salt may be used. Actually corrosion inhibitor evaluation tests, some of which are shown below, substantiate this phenomenon.

The following examples and tables showing the synthesis of each element of the composition, their formulation into a corrosion inhibitor composition, and its use as a corrosion inhibitor illustrate the invention in greater detail.

EXAMPLE I

Duomeen T, which consists of a mixture of diamines having the formula:

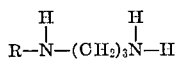

wherein R is an aliphatic hydrocarbon having from 8 to 22 carbon atoms, and in this instance, is derived from tallow acids which constitute a mixture of: lauric, myristic, palmitic, stearic, arachidic, myristoleic, palmitoleic, oleic, linoleic, linolenic and arachidonic acids, is admixed with the gilsonite material. Then the mixture is neutralized with petroleum naphthenic acid, usually in mixed form, such as the "Sunaptic Acids" sold by the Sun Oil Company of Philadelphia, Pa. In this instance, the Sunaptic Acids mixture is a "Sunaptic Acids B" mixture. Typical properties for such mixed acid mixture are acid number 159 mg. of KOH per gram, average molecular weight 330, average formula $C_{21}H_{37}O_2$ average type formula

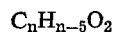

and distillation range 287–530° F./2 mm. Hg (0–98%).

EXAMPLE II

Another mixture of neutral salts is produced by using Sunaptic Acids A to neutralize a Duomeen T-gilsonite material mixture.

Typical properties of the Sunaptic Acids A mixture of Sun Oil are: acid number 178 mg. of KOH per gram, average molecular weight 297, average molecular formula $C_{19}H_{34}O_2$ average type formula $C_nH_{2n-4}O_2$, and distillation range 315–485° F./2 mm. Hg (0–95%).

As in Example I, the mixture of salts is produced merely by stirring together the naphthenic acid component with the diamine-gilsonite mixture. The resulting mixture of salts varies from one salt to the next not only in the diamine residue, but also in the acid residue since the naphthenic acids used are also a mixture of acids having varying molecular weight and chemical structure, but this is of no importance in obtaining the objectives of this invention.

The finished mixture of salts will be found to be a viscous liquid at room temperature with the following properties: Saybolt Universal viscosity at 120° F. of about 8700 seconds. A.P.I. gravity of 60° F. of about 16.4, and refractive index of about 1.4966.

EXAMPLE III

A Duomeen T-gilsonite mixture is neutralized with the naphthenic acids conforming in preparation and properties to those sold commercially as "Sunaptic Acids C." Typical properties for such acids are acid number 122 mg. of KOH per gram, average molecular weight 415, average molecular formula $C_{28}H_{49}O_2$, average type formula $C_nH_{2n-7}O_2$, and distillation range 408–596° F./2 mm. Hg (0–95%).

EXAMPLE IV

An ethoxylated Duomeen T-gilsonite salt mixture may be prepared by using naphthenic acids conforming in preparation and properties to those sold commercially as "Sunaptic Acids B." Typical properties for such acids are acid number 159 mg. of KOH per gram, average molecular weight 330, average molecular formula $C_{21}H_{37}O_2$, average type formula $C_nH_{2n-5}O_2$, and distillation range 287–530° F./2 mm. Hg (0–98%).

The ethoxylated Duomeen T is prepared by reacting two moles of ethylene oxide under known ethoxylation conditions with one mole of Duomeen T.

The concentration of each component in the above examples may be as listed in the tables below. Generally, however, concentrations of 10 to 70% of the gilsonite material based on the amine are effective to accomplish the objectives of this invention.

The tables also indicate typical corrosion inhibition values that may be attained when the compositions of this invention are utilized:

Table 1.—Five day static corrosion test with 1020 mild steel

[In kerosene and synthetic sea water (tested at 5 p.p.m. active ingredient)]

| Corrosion inhibitor: | Corrosion rate (MPY) [1] |
|---|---|
| None control | 3.97 |
| Duomeen T disalt of petroleum naphthenic acid | 1.55 |
| Gilsonite N-distillate salt of petroleum naphthenic acid | 3.45 |
| 80% Duomeen T; 20% gilsonite N-distillate petroleum naphthenate | 1.45 |
| 70% Duomeen T; 30% gilsonite N-distillate petroleum naphthenate | 1.60 |
| 60% Duomeen T; 40% gilsonite N-distillate petroleum naphthenate | 1.58 |

[1] See Formula I below.

It is evident from the above values that the gilsonite material enables reduction in concentration of the corrosion inhibitor with no adverse effect on the corrosion rate. Thus, it can be concluded that an enhancement in corrosion inhibition occurs.

TABLE 2

| Oil/H₂O | Conc., p.p.m. | Duomeen T salt of petroleum napthenic acid [1] | | Duomeen T salt of petroleum naphthenic acid [2] | | Duomeen T (60%) Gilsonite N-distillate (40%) salt of petroleum naphthenic acid [2] | |
|---|---|---|---|---|---|---|---|
| | | MPY | Percent inh. | MPY | Percent inh. | MPY | Percent inh. |
| 25/75 | Control | 27.96 | | 27.96 | | 27.96 | |
| 25/75 | 5 | 22.14 | 19.26 | 20.89 | 23.82 | 20.42 | 25.51 |
| 25/75 | 10 | 19.49 | 28.90 | 22.56 | 17.70 | 15.24 | 44.39 |
| 25/75 | 15 | 21.53 | 21.48 | 13.21 | 51.81 | 16.03 | 41.53 |
| 25/75 | 20 | 32.53 | | 24.35 | | 21.71 | 44.79 |
| 25/75 | 25 | 14.99 | 45.31 | 14.42 | 47.39 | 15.53 | 43.35 |
| 25/75 | 30 | 35.46 | | 20.42 | 25.51 | 15.24 | 44.40 |

[1] As made using Sun Oil Company's petroleum naphthenic acid.
[2] As made using Mobil Chemical Company's petroleum naphthenic acid.

Procedure.—In Table 2 above, the standard revolving wheel technique is used for comparing the H₂S corrosion inhibiting efficiency of each compound. Such a test evaluates for "down the hole" corrosion inhibition. It involves the use of a weighted steel coupon which is placed in a test cell containing 200 mls. of an oil-brine sample in ratios as shown above.

The steel coupon utilized is a 1020 mild steel coupon, ½ inch by 4 inches. To prepare it for testing, it is first degreased with isooctane, and then air dried and agitated, with many others, in a ball mill in the presence of 150 mesh Alundum powder for five days. Just before use in the test, the coupon is removed from the ball mill, washed in hot alcohol, and dried in hot acetone. This gives it a uniform clean surface.

The test cell utilized comprises an eight ounce French square bottle fitted with a cork and screw cap. The cork stopper holds the coupon in place in the bottle.

The brine of the oil-brine sample is a 5% NaCl solution of deionized water purged free of oxygen with pure nitrogen. After purging 500 parts of H₂S are added and the pH adjusted to 7±0.5 with a 1 N solution of NaOH.

The oil of the oil-brine sample constitutes kerosene which is, previous to use, filtered through fuller's earth (super filtrol) to remove polar organic material and then purged free of oxygen with nitrogen. H₂S, 500 p.p.m., is then added to simulate "down the hole" conditions.

During the test, each test cell is revolved for 24 hours at 100° F. and at 60 r.p.m. At the end of a test period, each coupon is removed, cleaned in an inhibited acid solution, rinsed in hot water, dried in hot alcohol and acetone and then reweighed. Test results are reported in corrosion rate (MPY) and corrosion protection (percent inhibition) values which are caculated as follows:

Formula I $$MPY = \frac{\text{weight loss}}{0.352 \times \text{area (in.}^2\text{)} \times \text{days of test}} \times 1000$$

Formula II.—Percent inhibition (percent inh.)

Percent inh. =

$$\frac{\text{wt. loss of control} - \text{wt. loss of inh. coupon}}{\text{wt. loss of control}} \times 100$$

In another test, values are obtained as follows:

TABLE 3

| Compound | Conc. (p.p.m.) | Percent protection |
|---|---|---|
| Duomeen T disalt of petroleum naphthenic acid | 100 | 82 |
| Duomeen T-Gilsonite N-base conc. (60%–40%) neutralized with petroleum naphthenic acid | 100 | 79 |
| Gilsonite N-base concentrate neutralized with petroleum naphthenic acid | 100 | 12 |

The test procedure utilized for Table 3 involves subjecting each test coupon to the corrosion inhibitor composition for the same predetermined time and then subjecting it to the corrosive agent, well brine in this instance, for another predetermined time which is the same throughout the test and calculating the percent protection attained, on a weight loss basis.

As should be evident from the above discussion, the compositions here are especially useful for inhibiting corrosion of metal equipment used in the recovery, transportation and treatment of oil and gas well fluids, gas condensate well fluids and water associated with hydrocarbon production; that is, water used in secondary recovery, pressure maintenance, or water flooding; this water may be either produced brine or water from a supply well. The customary injection practices which are known and used in the petroleum trade are generally suitable for the inhibitor composition of this invention. Usually, amounts ranging from 25 to 1000 parts per million (p.p.m.) and preferably from 50 to 200 p.p.m., based on the well fluids being tested, will be found to be effective.

It will thus be seen that the objects set forth above, among those made apparent from the preceding description, are efficiently attained and, since certain changes may be made in carrying out the above method and in the composition set forth without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A novel composition especially useful for corrosion inhibition consisting essentially of naphthenic acid salts of polyamines having the structure:

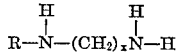

wherein
R is an aliphatic hydrocarbon having from 8 to 22 carbon atoms; and
$x$ is an integer from 2 to 4 in admixture with 10 to 70% by weight based on the amine of heterocyclic nitrogenous compounds as contained in the crude, semi-purified or purified by-products having a boiling point of about 200° F. to 750° F. resulting from the refining of gilsonite.

2. A novel composition especially useful for corrosion inhibition consisting essentially of the petroleum naphthenic acid salts of a mixture of diamines having the formula:

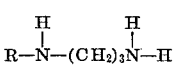

wherein
R is an aliphatic hydrocarbon having from 8 to 22 carbon atoms as derived from tallow acids in admixture with 10 to 70% by weight based on the amine of heterocyclic nitrogenous compounds as contained in the crude, semipurified or purified by-products having a boiling point of about 200° F. to 750° F. resulting from the refining of gilsonite.

3. A novel composition especially useful for corrosion inhibition consisting essentially of the petroleum naphthenic acid salts of an ethoxylated mixture of diamines having the formula:

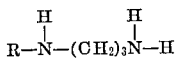

wherein
R is an aliphatic hydrocarbon having from 8 to 22 carbon atoms as derived from tallow acids in admixture with 10 to 70% by weight based on the amine of heterocyclic nitrogenous compounds as contained in the crude, semipurified or purified by-products having a boiling point of about 200° F. to 750° F. resulting from the refining of gilsonite.

4. The method of inhibiting the corrosion of ferrous metal surfaces comprising applying to said surface a composition consisting essentially of naphthenic acid salts of polyamines having the structure:

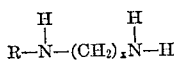

wherein
R is an aliphatic hydrocarbon having from 8 to 22 carbon atoms; and
$x$ is an integer from 2 to 4 in admixture with 10 to 70% by weight based on the amine of heterocyclic nitrogenous compounds as contained in the crude, semipurified or purified by-products having a boiling point of about 100° F. to 750° F. resulting from the refining of gilsonite.

5. The method of inhibiting the corrosion of ferrous metal surfaces comprising applying to said surface an aqueous solution of 25 to 1000 p.p.m. of naphthenic acid salts of polyamines having the structure:

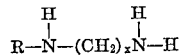

wherein
R is an aliphatic hydrocarbon having from 8 to 22 carbon atoms; and $x$ is an integer from 2 to 4 in admixture with 10 to 70% by weight based on the amine of heterocyclic nitrogenous compounds as contained in the crude, semipurified or purified by-products having a boiling point of about 200° F. to 750° F. resulting from the refining of gilsonite.

References Cited
UNITED STATES PATENTS

| 2,472,400 | 6/1949 | Bond et al. | 252—8.55 |
| 2,814,593 | 11/1957 | Beiswanger et al. | 252—8.55 |
| 2,914,475 | 11/1959 | Oxford | 252—8.55 |
| 2,914,557 | 11/1959 | Oxford | 252—8.55 |

FOREIGN PATENTS

| 573,800 | 3/1958 | Italy. |

HERBERT B. GUYNN, *Primary Examiner.*

U.S. Cl. X.R.

252—8.55, 388, 390, 394; 21—2.5